Sept. 25, 1945.   R. R. WEDDELL   2,385,750
METAL REMOVING TOOL
Filed May 10, 1943
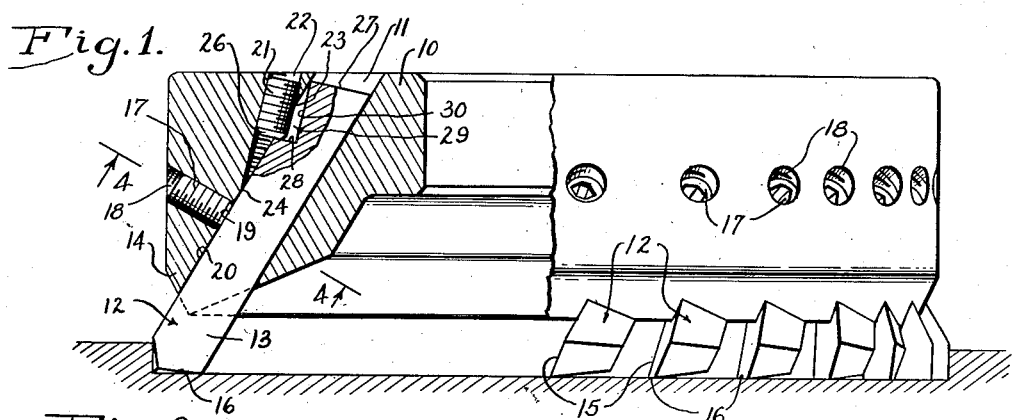
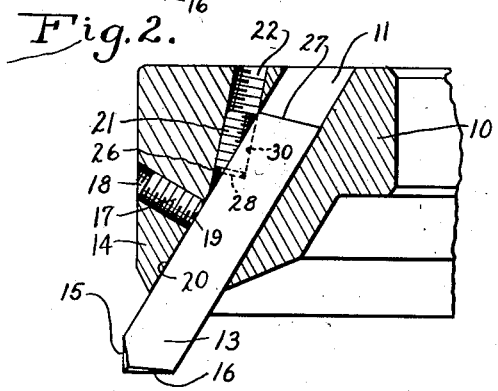
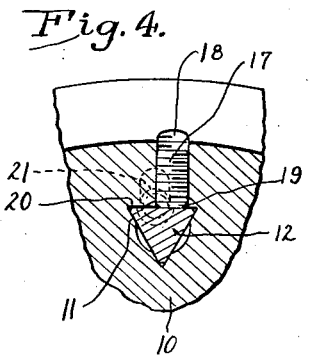
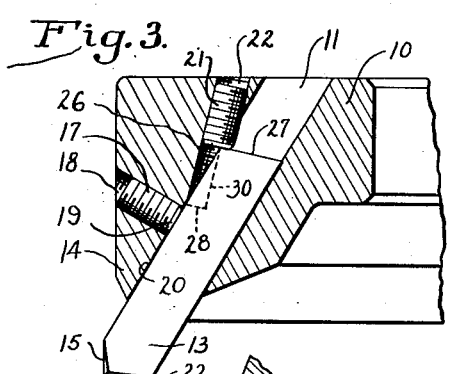
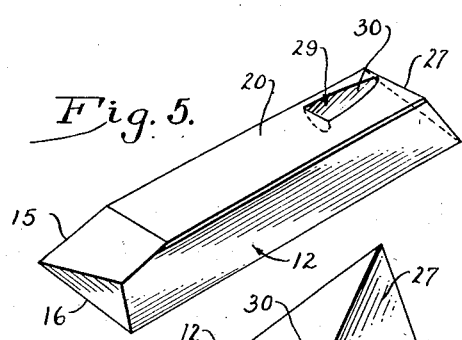
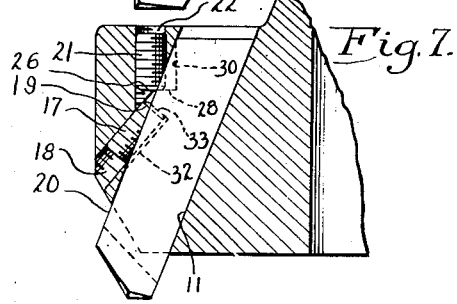
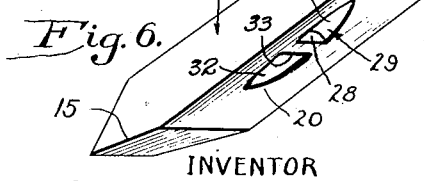
INVENTOR
Ralph R. Weddell
BY Parker, Carlson, Pitzner & Hubbard
ATTORNEYS Patented Sept. 25, 1945

2,385,750

UNITED STATES PATENT OFFICE 2,385,750

METAL REMOVING TOOL

Ralph R. Weddell, Rochester, N. Y.

Application May 10, 1943, Serial No. 486,406

9 Claims. (Cl. 29—105)

This invention relates to metal removing tools of the inserted blade type, and the general object is to provide a novel blade mounting which permits of wear adjustment and efficiency in the use of cutting material, and which locks the blade firmly in the cutter body.

Another object is to provide a novel blade mounting which enables the amount of blade adjustment to be gauged accurately over a wide range.

The invention also resides in the novel construction of the blade which enables the foregoing objects to be carried out.

Other objects and advantages of the invention will become apparent from the following detailed description taken in connection with the accompanying drawing, in which Figure 1 is a side view partially in diametrical section of a tool embodying the improved mounting.

Figs. 2 and 3 are fragmentary sections showing different adjusted positions of the blade.

Fig. 4 is a section taken along the line 4—4 of Fig. 1.

Fig. 5 is a perspective view of the blade.

Fig. 6 is a perspective view of a modified blade.

Fig. 7 is a fragmentary sectional view of a modified form of the blade mounting.

While the invention is applicable to all kinds of inserted tooth metal removing cutters including milling cutters, lathe tools, hollow mills, and boring bars, it has been shown for purposes of illustration embodied in a face mill (Figs. 1 to 4) and in a fly-cutter (Fig. 7). It is to be understood that I do not intend, by such disclosure, to limit the invention to any particular kind of tool nor to the particular blade mounting shown, but aim to cover all modifications and alternative constructions falling within the spirit and scope of the invention as expressed in the appended claims.

The face mill shown in Figs. 1 to 4 has a cylindrical body or holder 10 formed with an annular series of recesses 11 receiving blades 12 whose ends 13 project from a peripheral flange 14 around one end face of the body and are sharpened to form the usual cutting edges 15 and 16. Herein, the recesses 11 which open on opposite end faces of the body 10 diverge axially and are broached or otherwise formed to a generally equilateral triangular cross section with one side of the triangle facing radially and outwardly in the present instance.

The blades 12, which may be composed of any suitable cutting material or carry inserts of such material, are of equilateral triangular cross section with the corners relieved so that the sides will seat against the corresponding walls of the blade recess as shown in Fig. 4. Locking of the blades is effected by individual set screws 17, preferably of the socket head type, threading into holes 18 that open on the periphery of the body and, in the forms shown in Figs. 1 to 4, are disposed perpendicular to the outer wall of the blade recess. Preferably, the screw holes are offset laterally from the axis of the recess so that the flat inner end 19 of the screw engages the side face 20 of the blade to one side of the center line as shown in Figs. 4 and 5. Thus, when the single locking screw is tightened down, the blade is forced firmly into its V-shaped seat.

Adjustment of the blade for wear is effected by loosening the locking screw 17 and shifting the blade endwise in its recess. This is accomplished in accordance with the present invention by a set screw 21, preferably of the same size and type as the locking screw 17, threading into a hole 22 in the body 10 which hole extends in the general direction of the adjustment and converges inwardly at a small angle, about twenty degrees, and intersects the blade recess. The intersection extends from a point 23 near the end of the blade recess remote from the cutting edges to a point 24 about midway between the ends of the recess. Thus, the screw 21, although disposed at an angle to the recess, has a long range of adjustment along the recess as shown by its extreme positions in Figs. 1 and 2.

In order to provide an extremely long range of wear adjustment with a blade of given length, the present invention contemplates formation of the blade with a plurality of shoulders spaced along the blade and disposed below the side surface 20 for selective engagement by the flattened end surface 26 of the screw. Two such surfaces 27 and 28 are provided in the present instance, both facing away from the cutting edges of the blade and angularly disposed substantially perpendicular to the axis of the adjusting screw 21 in the assembled cutter. Herein, one of the surfaces 27 is at the end of the blade remote from the cutting edges and is formed simply by cutting off the blade so that the angle included between the blade face 20 and the shoulder surface 27 will be obtuse and approximately 110°.

The other shoulder 28 constitutes the end wall of a recess or niche formed in the side 20 of the blade near the end 27 and having a bottom 30 which preferably is concave in shape and extends substantially perpendicular to the shoulders 28 and 21 and, therefore, parallel to the screw 21 in the assembled cutter. Thus, the bottom 30 converges toward and intersects the surface 20 at a point near the shoulder 21.

The spacing of the surfaces 27 and 28 is determined by the length of the screw 21 and the inclination of the screw hole relative to the blade recess. In general, this spacing is such that when the screw has been advanced substantially through the range of its effective engagement of the threads on the body, as shown in Fig. 2, the end surface 27 will be disposed substantially at the point where the screw end 26 will, if retracted as shown in Fig. 3, engage the end surface 27. The niche 29 is offset laterally from the center line of the blade, and the hole 22 is similarly offset on the side opposite the line of engagement between the side 20 and the locking screw 17. Thus, the niche may be advanced during wear adjustment of the blade past the screw 17 without interfering with the effective locking action of the latter.

Adjustment of the blade for wear is effected as follows. Initially, the blade is locked in the body with one side of the adjusting screw disposed in the niche 29 and with part of the end 26 overlapping the shoulder 28 as shown in Fig. 1. The blade is thus backed rigidly against endwise movement, and this backing, together with the clamping action of the screw 17, holds the blade firmly and rigidly in the body 10. When the cutting edges become worn and the blade must be advanced to permit resharpening, the locking screws of all of the blades are loosened, after which the screws 21 are turned further into the holes 22. The shoulders 28 and, therefore, the blades are advanced longitudinally of the blade recess, and, after the proper degree of advance, the screws 17 are tightened and the cutter is ready for sharpening.

The adjustment may be gauged accurately, and, by turning the different screws 21 through equal angles, all of the blades will be adjusted precisely equal distances. As a result, and because the adjustment is progressive instead of step-by-step, the amount of metal to be removed in sharpening may be reduced to a minimum.

Such adjustment may be repeated from time to time until the blades have reached the position shown in Fig. 2 in which the bottom of the niche 29 lies close to the screw 21 and the latter has reached its limiting effective position in the hole 22. To effect further adjustment, the screw 21 is retracted in the hole 22 to its initial position, and the blade is positioned with its end surface 27 instead of the shoulder 28 in abutment with the screw end 26 as shown in Fig. 3. Thereafter, repeated adjustments may be made until the screw 21, while engaging the blade end 27, has reached the limit of its range. In this advance, the niche 29 may pass the locking screw 17 without interfering with the effectiveness of the latter.

By adapting the blade with one or more shoulders as above described for engagement with the back-up screw 21, the range of the blade adjustment is increased substantially. Actually, the increase with the arrangement shown is about thirty-five per cent as compared to engagement of the screw with the blade end alone. This represents a corresponding saving in the cost of replacement blades. In addition, the overall length of the cutter body is minimized, and broaching of the blade recesses is greatly facilitated. The form of the blade itself is particularly advantageous. It is plain sided except for the niche 29. Being triangular with the configuration on one side only, it may be formed cheaply by machining, forging, or casting, and possesses maximum strength for a given weight of cutting material used.

If desired, the range of adjustment of the blade may be increased by providing a greater number of niches 29 and shoulders 28 spaced along the blade. Also, in certain types of tools, such as fly-cutters, the locking screw 17 may be utilized to perform the additional function of resisting the forces sometimes applied to the blade tending to pull the blade out of its mounting. For this purpose, the screw hole 18 would be extended relative to the blade recess 11 at a small angle and in a direction opposite to the hole 22 as shown in Fig. 7. Similarly, the blade face 20 would have a second niche 32 of the same form as the niche 29 formed at the blade with a shoulder 33 facing oppositely from the shoulder 28 and spaced along the blade farther from the end 27.

With both of the screws 17 and 21 tightened as shown in Fig. 7, the blade is locked positively against endwise displacement in either direction, and the two inclined screws force the blade firmly in the desired socket. The two are offset as before to avoid interference between one screw and the niche for the other. Wear adjustment of the cutter thus modified is effected by backing off the screw 17 followed by advance of the screw 21.

I claim as my invention:

1. A cutting tool having, in combination, a body having an elongated blade recess open at one end and providing a V-shaped seat along one side, an elongated blade of generally triangular cross-section disposed in and adjustable along said recess with one end having a cutting edge thereon and projecting from the body through said open end, the opposite end of the blade having a surface at said end set at an obtuse included angle relative to one side of the blade, a threaded hole in said body intersecting said recess and disposed substantially perpendicular to said end surface, a niche formed in said blade and having a surface spaced from and disposed substantially parallel to said end surface, a screw threading into said hole and engageable selectively with either of said surfaces depending on the axial position of said blade and defining an adjustable rear abutment for the blade, and means engageable with said blade to press the same laterally against said seat.

2. A cutting tool having, in combination, a body having an elongated blade recess open at one end and providing a seat along one side, an elongated blade disposed in and adjustable along said recess with one end having a cutting edge thereon and projecting from the body through said open end, the opposite end of the blade having a surface at said end making an obtuse included angle relative to one side of the blade, a threaded hole in said body intersecting said recess and disposed substantially perpendicular to said end surface, a niche formed in said blade and having a surface spaced from and disposed substantially parallel to said end surface, a screw threading into said hole and engageable selectively with either of said surfaces depending on the axial position of said blade and defining an adjustable rear abutment for the blade, and means operable to press said blade laterally against said seat.

3. A cutting tool having, in combination, a body having an elongated blade recess open at one end, an elongated blade disposed in and adjustable along said recess, a screw threading into said body and engaging one side face of said blade to clamp the latter against one side wall of said recess with one end of the blade projecting from said body through said open end, a shoulder on said side face of the blade intermediate the ends of said blade and facing away from said projecting end and laterally offset with respect to the longitudinal center line of said side face, and making an obtuse included angle with said blade side, and a second screw threading into said body and engaging said shoulder to permit adjustment of the blade axially, said screws being offset from each other laterally on opposite sides of the longitudinal center line of said side face whereby to provide an unbroken surface on said face at one side of the longitudinal center thereof for engagement by said first mentioned screw.

4. A cutting tool having, in combination, a body having a blade recess open at one end, a blade disposed in said recess with one end projecting from said recess end, a plurality of shoulders on said blade spaced along the latter and respectively facing toward opposite ends of the blade, said shoulders each making an obtuse included angle with one side of the blade, threaded holes in said body intersecting said recess and disposed substantially perpendicular to said shoulders, and screws in said holes engaging said shoulders and operable to adjust the blade axially and clamp it against one side wall of the recess.

5. A tool blade having longitudinally spaced recesses formed in one side and respectively defining shoulders which face in opposite directions longitudinally of the blade, said shoulders being disposed at obtuse included angles relative to said side and offset relative to each other laterally of the blade axis.

6. A tool blade having longitudinally spaced recesses formed in one side intermediate the ends thereof and respectively defining shoulders facing in opposite directions longitudinally of the blade, said shoulders being disposed at obtuse included angles relative to said side.

7. A cutting tool having in combination a body having an elongated blade recess open at one end and providing a blade seat along one side, an elongated blade disposed in and adjustable along said recess with one end projecting from the body through said open end, said body being provided with a hole intersecting said recess, the axis of the hole being inclined and converging toward the axis of the recess in the direction of said open end, a member in said hole adjustable axially thereof and including an end abutment portion engageable with the blade, means for adjusting said member axially of said hole to move said abutment portion into and along said recess, and a plurality of shoulders on said blade spaced along the latter and each shoulder including a surface portion lying in a plane disposed substantially perpendicularly to the axis of said hole and said member, said shoulders being selectively and successively engageable with the abutment end portion of said member to locate said blade in different positions determined by the adjustment of the member within said hole and the particular shoulder which is in abutting engagement therewith, and means for clamping the blade within the recess in any one of its adjusted positions.

8. A tool blade comprising an elongated sided block having a cutting edge at one end thereof and being of substantially uniform cross-section between its ends, the other end of said block forming an adjustment abutment and having an obtuse included angle with one side of the block, and means defining a depression in said one side of the block defined in part by an adjustment abutment shoulder facing in the same direction as said end abutment, said abutment shoulder and said end abutment lying in substantially parallel planes and being disposed relative to said blade at an angle such that a perpendicular to either said end abutment or said shoulder abutment extends transversely through the blade and intersects the opposite side of the blade.

9. A tool blade comprising an elongated sided block having a cutting edge at one end thereof and being of substantially uniform cross-section between its ends, the other end of said block forming an adjustment abutment and having an obtuse included angle with one side of the block, and means defining a depression in said one side of the block defined in part by an adjustment abutment shoulder facing in the same direction as said end abutment, said abutment shoulder and said end abutment lying in substantially parallel planes and being disposed relative to said blade at an angle such that a perpendicular to either said end abutment or said shoulder abutment extends transversely through the blade and intersects the opposite side of the blade, and the bottom of said depression lying adjacent said shoulder abutment converging toward said one side of the block and intersecting the plane thereof at such side substantially at the intersection of the end abutment with said one side.

RALPH R. WEDDELL.